Nov. 3, 1970 A. J. ROBERT 3,537,205
ANIMATED WATER FOWL DECOY OR SIMILAR ARTICLE
Filed Dec. 16, 1968 2 Sheets-Sheet 2

ARMAND J. ROBERT INVENTOR.

BY *John W. Kraft*

United States Patent Office 3,537,205
Patented Nov. 3, 1970

3,537,205
ANIMATED WATER FOWL DECOY
OR SIMILAR ARTICLE
Armand J. Robert, Nampa, Idaho
(992 Patsy Drive, Pocatello, Idaho 83201)
Filed Dec. 16, 1968, Ser. No. 783,815
Int. Cl. A01m 31/06
U.S. Cl. 43—3      2 Claims

ABSTRACT OF THE DISCLOSURE

An animated water fowl decoy has a body portion in the shape and configuration of a live water fowl having fastened thereto a multiplicity of ground mounting stakes for securing the body portion to the ground, and a pair of movable simulated wing members each including a skeleton-like frame encased in a simulated water fowl wing, the frame having a mounting stud suitably fastened to the body portion, a humerus member, and an ulna-radius member connected to each other by a plurality of coiled, pre-tensioned springs. The wing members include members for securing a line thereto to provide a flapping-like movement of the wing members in response to movement of the line by a hunter to attract water fowl to within firing range of the hunter.

DESCRIPTION OF THE PRIOR ART

Field of the invention

This invention relates to water fowl decoys used in hunting water fowl, and more particularly to an animated decoy operable to attract live water fowl in response to natural-like movement of the decoy simulating the movement of live water fowl.

Detailed description of the prior art

In hunting water fowl it is common practice to place decoys which simulate live water fowl in a pond, marsh or feeding area to attract live water fowl to the area and to within firing range of the hunter. Bird calling whistles are frequently employed by hunters to first attract live water fowl to the decoys. It is commonly known that wild water fowl are inherently timid creatures and will ordinarily avoid the presence of human beings or movements which are not natural. Hence, any movement by a hunter or any unnatural movement in the surrounding area tends to frighten live water fowl away from the area. On the other hand the lack of movement of decoys formerly known in the prior art tends to fail to attract live water fowl even when employing bird calling whistles in cooperation with such decoys.

Summary of the invention

Accordingly, it is a primary aim of the present invention to provide in a water fowl decoy, means for imparting natural-like movement in the decoy similar to that of live water fowl to attract the water fowl. It is a further object of this invention to provide means by which a flapping-like movement may be imparted to the wing members of a decoy in response to the command and operation by the hunter. Another object of the present invention is to provide a decoy having wing members including a skeleton-like frame encased in a simulated water fowl wing, the frame including a mounting stud suitably fastened to the body portion of the decoy, a humerus member, and an ulna-radius member, each of which is connected together by a plurality of coiled, pre-tensioned springs which form joints between the members for movement of the simulated wing; means on the wing members to which a line may be attached to cause movement of the wings in response to movement of the line by a hunter in a remote position; and to provide an animated water fowl decoy that is simple and inexpensive to construct.

Generally the invention comprises a body portion in the shape and configuration of a live water fowl, a multiplicity of ground mounting stakes suitably fastened to the body portion operable to secure the decoy to the ground, and a pair of simulated wing members each including a skeleton-like frame encased in a fabric-like, semi-rigid skin portion cut in the shape and configuration of a wing of a live water fowl, the skeleton-like frame comprising a mounting stud suitably fastened to the body portion of the decoy, a humerus member, and a ulna-radius member connected to each other by a plurality of coiled, pre-tensioned springs to form joints between the members. Each of the simulated wing members are provided with an eyelet means suitably fastened thereto to which a line may be attached and extended to a remote position to a hunter. A flapping-like movement is caused in the wings in response to movement of the line by the hunter. Hence, water fowl may be attracted to within firing of the hunter when they observe the natural-like flapping movement in the decoy.

A clearer understanding may be had from the detailed description and in connection with the drawings following.

DESCRIPTION OF THE PREFERRED EMBODIMENT

Figure 1:
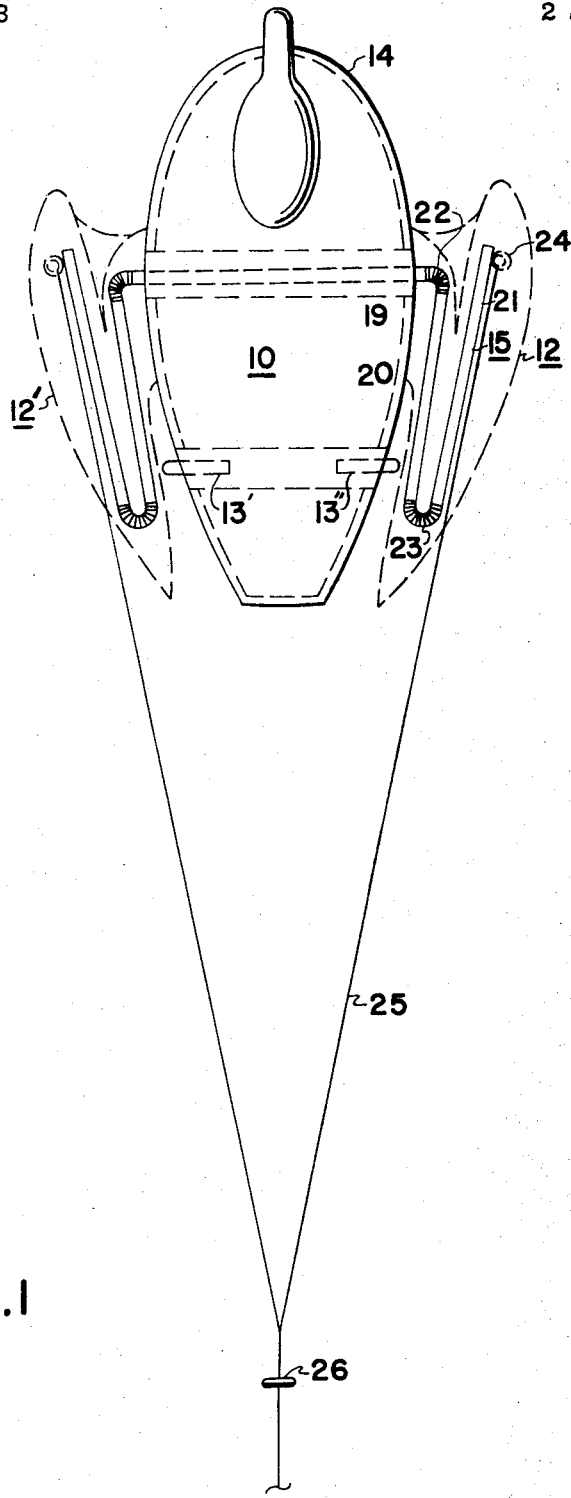
FIG. 1 is a plan view of a water fowl decoy of the present invention showing the wing members thereof in phantom view about the movable skeleton-like frame of said wing members, and showing the framework of the body and mounting portions in dotted lines within the body.
Figure 2:
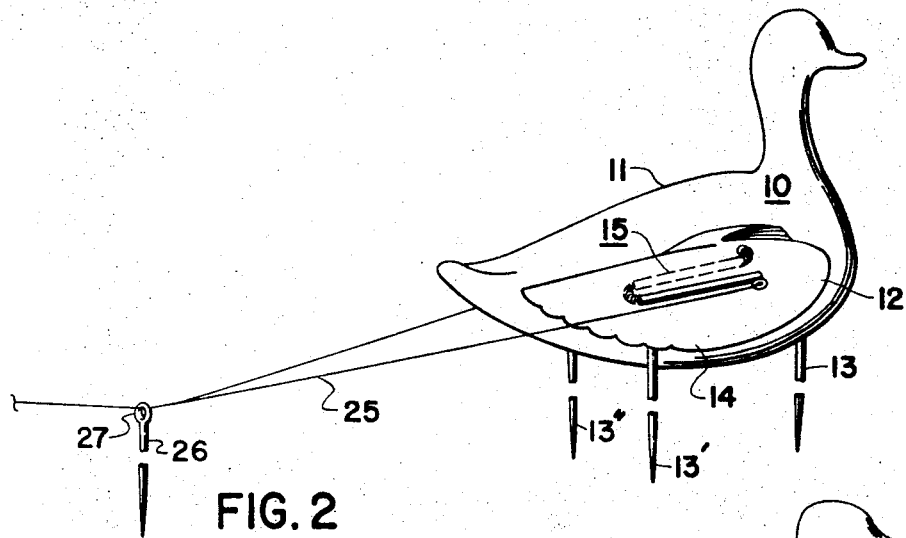
FIG. 2 is a side perspective view of a water fowl decoy with a wing member retracted in their normal at rest position.
Figure 3:
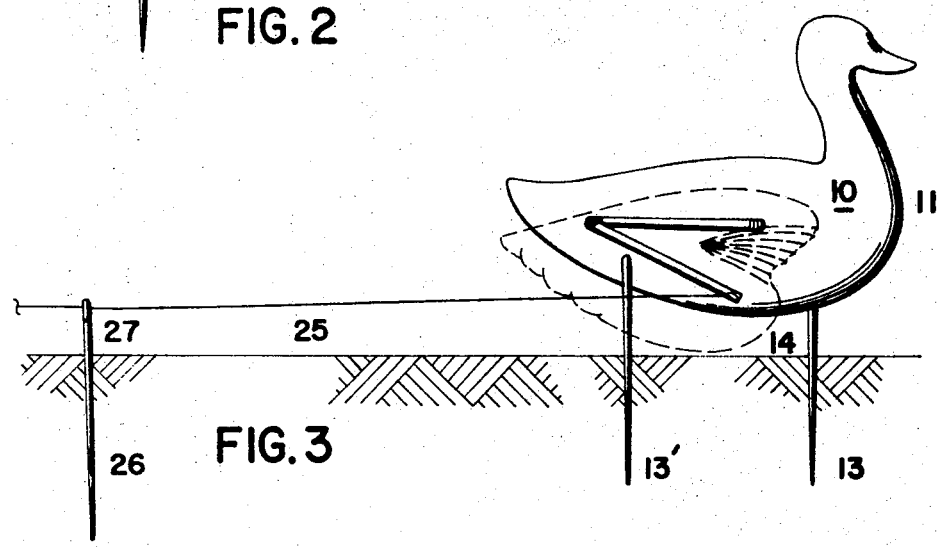
FIG. 3 is a side elevational view of the invention showing a wing member thereof extended.

Referring now to the drawings, the water fowl decoy of the present invention is shown to advantage in FIG. 1 and is generally designated by the numeral 10. The decoy 10 comprises a body portion 11 in the shape and configuration of a live water fowl, a pair of movable simulated wing members 12 and 12' and a multiplicity of ground mounting stakes 13, 13' and 13". The body portion 11 may be molded into the configuration of a water fowl from any suitable material such as plastic or papier-maché or the like. The mounting stakes 13. 13' and 13" are suitably fastened in the body portion 11 to provide means for fixing the decoy to the ground.

Figure 4:
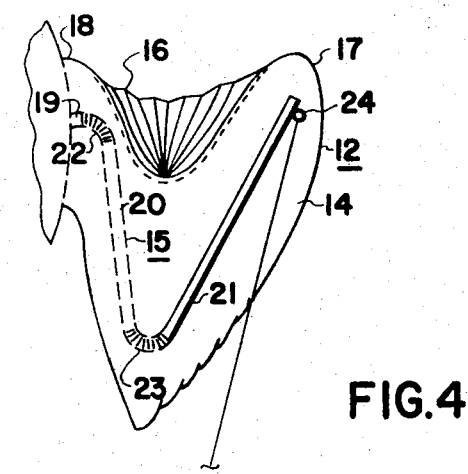
FIG. 4 is a fragmentary view of the decoy showing the detailed construction of a wing member and showing the movable skeleton-like member in dotted lines.

The simulated wing memberss 12 and 12' comprise flexible, semi-rigid, fabric-like skin portions 14 cut in the shape and configuration of a live water fowl, suitably fastened over a skeleton-like frame generally designated by the numeral 15. Since the construction of one wing member is identical except that one wing is the hand opposite the other, a description of the construction of one wing member will suffice for the other. The wing member 12 is shown to advantage in FIG. 4. The fabric-like skin portion 14 may comprise two pieces of fabric cut into the configuration of a wing of a water fowl and sewn together to form the exposed surfaces of the wing member 12, and includes a pleated scapular portion 16 disposed between the bend 17 and the shoulder 18 of the simulated wing. Padding material may be placed between the fabric to provide dimensional shape for the wing if desired. The skeleton-like frame 15 shown to advantage in FIG. 1 in solid lines and in dotted lines in FIG. 4, comprises a dowel-like stud 19 suitably fastened to the decoy body 11, a dowel-like member forming the humerus portion 20, and a dowel-like member forming the ulna-radius portion 21. A coiled, pre-tensioned spring 22 and a coiled, pre-tensioned spring 23 are threadably mounted on stud 19 and one terminal end of humerus portion 20, and on the opposite terminal end of humerus portion 20 and one terminal end of ulna-radius portion 21, respectively. Hence, the springs 22 and 23 provide movable joint means for the wing 12. The skin portion 14 is fitted about the frame 15 and suitably mounted to the decoy 11 such as by fastening with a suitable adhesive material. It has been found preferable to hem or tie the skin portion 14 to the humerus 20 and the ulna-radius 21 so that movement of the frame is transmitted to the skin portion 14. It has been found in practice only a single skin on the upper surface of the frame is required to simulate the wing to attract live fowl, but has been found to be more complex to attach and to maintain its shape.

An eyelet 24 is screwed through the skin portion 14 near the lesser covert of the wing and into the dowel-like ulna-radius 21 near the terminal end opposite the spring 23. A line 25 is tied to the eyelet 24 of each of the wing members 12 and 12' and is extended through a stake 26 having an eye 27 to the hunter. When the hunter pulls the line 25 the wing member 12 and 12' are caused to flap and thereby attract the attention of live fowl. It is to be understood that a plurality of such decoys may be used at one time.

Having thus described a preferred embodiment of the invention which embodies the teachings and principles of my invention therefor, it is to be appreciated and will be apparent to those skilled in the art that many physical changes could be made on the invention without altering the inventive concepts embodied therein.

I claim:

1. An animated water fowl decoy comprising a body portion conforming to the shape and configuration of a live water fowl, a pair of simulated wing members resiliently mounted to said body portion, each of said wing members include flexible, semi-rigid, skin-like portion cut into the shape and configuraion of the wing of a live water fowl and having one terminal end suitably fastened to said body portion, a skeleton-like frame resiliently mounted to said body portion, said skin-like portion being disposed on and mounted on said skeleton-like frame, said skeleton-like frame comprising a humerus member resiliently mounted at one of its terminal ends to said body portion and at its opposite terminal end to a coiled, pre-tensioned spring, an ulna-radius member connected to said coiled, pre-tensioned spring at one of its terminal ends, said wing members each being provided with means for tying a line thereto near the terminal end of said ulna-radius member opposite said coiled, pretensioned spring, said line being operable to cause a flapping-like motion of said wing members in response to movement of said line.

2. The article of claim 1 including a multiplicity of grounding mounting stakes suitably fastened to the under body portion of the decoy to secure said decoy operable to the ground.

References Cited

UNITED STATES PATENTS

| | | | |
|---|---|---|---|
| 74,458 | 2/1868 | Wales | 43—3 |
| 2,663,108 | 12/1953 | Dixon et al. | 43—3 |
| 3,435,550 | 4/1969 | Carlson | 43—3 |

WARNER H. CAMP, Primary Examiner